(12) United States Patent
Hong et al.

(10) Patent No.: US 9,175,738 B2
(45) Date of Patent: Nov. 3, 2015

(54) DISC BRAKE

(71) Applicant: MANDO CORPORATION, Pyeongtaek-si (KR)

(72) Inventors: Seon Ki Hong, Seoul (KR); Young Hun Kong, Gunpo-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 159 days.

(21) Appl. No.: 13/894,359

(22) Filed: May 14, 2013

(65) Prior Publication Data
US 2014/0020989 A1    Jan. 23, 2014

(30) Foreign Application Priority Data
Jul. 20, 2012  (KR) .................. 10-2012-0079120

(51) Int. Cl.
| | |
|---|---|
| *F16D 55/02* | (2006.01) |
| *F16D 55/226* | (2006.01) |
| *F16D 65/18* | (2006.01) |
| *F16D 65/56* | (2006.01) |
| *F16D 121/04* | (2012.01) |

(52) U.S. Cl.
CPC .............. *F16D 55/226* (2013.01); *F16D 65/18* (2013.01); *F16D 65/567* (2013.01); *F16D 2121/04* (2013.01)

(58) Field of Classification Search
CPC ....... F16D 65/56; F16D 65/567; F16D 65/58; F16D 65/60; F16D 65/66; F16D 65/68; F16D 65/70
USPC ........................... 188/71.7, 71.8, 71.9, 196 V
See application file for complete search history.

(56) References Cited

U.S. PATENT DOCUMENTS

| | | | | |
|---|---|---|---|---|
| 6,651,784 | B1 * | 11/2003 | Barbosa et al. | 188/71.9 |
| 7,490,703 | B2 * | 2/2009 | Maehara | 188/72.6 |
| 2007/0045062 | A1 * | 3/2007 | Watada | 188/72.8 |
| 2008/0135354 | A1 * | 6/2008 | Petri et al. | 188/73.41 |
| 2011/0155520 | A1 * | 6/2011 | Takahashi et al. | 188/72.6 |

(Continued)

FOREIGN PATENT DOCUMENTS

| | | |
|---|---|---|
| CN | 1786506 | 6/2006 |
| CN | 102242784 | 11/2011 |

(Continued)

OTHER PUBLICATIONS

Machine translation of DE 4417741 (no date).*

(Continued)

*Primary Examiner* — Nicholas J Lane
(74) *Attorney, Agent, or Firm* — Ladas & Parry, LLP

(57) ABSTRACT

Disclosed herein is a disc brake having a carrier at which a pair of pad plates is installed and a caliper housing slidably installed on the carrier and provided with a cylinder allowing a piston to be installed therein, the disc brake including an adjuster installed in the piston, a push rod installed in the cylinder and provided with a flange extending toward an inner circumferential surface of the cylinder, a ramp coupled to the flange to prevent rotation of the push rod and moving along with the push rod and seated in a seating groove provided at a rear wall of the cylinder, a spring case fixed to the cylinder and forming a predetermined accommodation space between the cylinder and the push rod, and an elastic member arranged in the accommodation space of the spring case to provide elastic force to the push rod and the ramp.

8 Claims, 7 Drawing Sheets

(56) References Cited

U.S. PATENT DOCUMENTS

2013/0186716 A1* 7/2013 Kong ............................ 188/71.8
2014/0020991 A1* 1/2014 Kong et al. .................. 188/72.3

FOREIGN PATENT DOCUMENTS

| CN | 103225658 | | 7/2013 | |
| DE | 4417741 | A1 * | 11/1995 | .............. F16D 65/56 |
| DE | 19816211 | | 7/1999 | |
| KR | 10-2010-0089277 | | 8/2010 | |
| KR | 10-2011-0136419 | | 12/2011 | |

OTHER PUBLICATIONS

Office action dated Aug. 19, 2013 from corresponding Korean Patent Application No. 10-2012-0079120 and its English translation by Google Translate.
Office Action dated May 26, 2015 for Chinese Patent Application No. 201310192851.6.

* cited by examiner

DISC BRAKE

CROSS-REFERENCE TO RELATED APPLICATION(S)

This application claims priority to Korean Patent Application No. 10-2012-0079120, filed on Jul. 20, 2012 in the Korean Intellectual Property Office, the disclosure of which is incorporated herein by reference in its entirety.

BACKGROUND

1. Field

Embodiments of the present invention relate to a disc brake which may stably return a piston when braking operation is terminated and improve the effect of return of the piston.

2. Description of the Related Art

A disc brake is a device that is generally used to slow a vehicle to a stop by forcibly pressing friction pads against both sides of a disc rotating together with a wheel of the vehicle.

To reduce brake drag that is caused by continuous contact between the disc and the friction pads after the braking operation, two solutions may be considered for such disc brakes. One solution is to move the piston backward using a sealing member and a roll-back chamfer. The other solution is to move the piston backward by applying a compression spring to pad plates, which are pressed against the disc.

FIG. 1 is a cross-sectional view illustrating a conventional disc brake, and FIG. 2 is a view illustrating moving the piston backward using a sealing member and a roll-back chamfer.

As shown in FIGS. 1 and 2, a disc brake 10 includes a pair of pad plates 11 to generate braking force by being pressed against a disc D, a carrier (not shown) to support the pair of pad plates 11, a caliper housing 20 installed at the carrier and provided with a piston 22 slidably installed in a cylinder 21 to apply pressure to the pair of pad plates 11, and a sealing member 30 interposed between an inner surface of the cylinder 21 and an outer surface of the piston 22 of the caliper housing 20. The sealing member 30 serves to seal the space between the inner surface of the cylinder 21 and the outer surface of the piston 22 to prevent leakage of brake oil and to allow the piston 22 to be moved forward in the direction of arrow A, as shown in FIG. 2, for implementation of braking and moved back to an original position thereof by resilience of the sealing member 30, by which the sealing member 30 recovers an original shape thereof, when the braking operation is terminated.

The sealing member 30 is formed in a shape of a ring to be inserted into a circular roll-back chamfer 23 provided in the inner surface of the cylinder 21, and has a quadrilateral cross section. In addition, the roll-back chamfer 23 to accommodate the sealing member 30 is provided with a slope 24 at a side of the opening facing the direction opposite to the direction of braking (indicated by arrow A) to allow the sealing member 30 to be deformed when the piston 22 is moved forward in the direction of braking, as shown in FIG. 2.

When the piston 22 is moved forward to perform braking, the sealing member 30 is deformed as shown in FIG. 2. When the braking operation is terminated, the sealing member 30 returns in the direction opposite to arrow A to an original state thereof shown in FIG. 1. Accordingly, the piston 22 is moved back to an original position thereof by the resilience of the sealing member 30. This action is referred to as roll-back. The return distance of the piston 22 depends on the deformed width L of the sealing member 30.

However, in the conventional disc brake 10, since the side of the sealing member 30 facing the direction in which braking is performed is a flat surface roughly perpendicular to the outer surface of the piston 22 as shown in FIG. 1, the deformed width L of the sealing member 30 is limited as shown in FIG. 2, and thereby the return distance of the piston 22 may be short. That is, the deformation of the conventional sealing member 30 is small, and thus increasing the return distance of the piston 22 may be limited. If the return distance of the piston 22 is short, the friction pads 12 attached to the pad plates 11 may not be sufficiently separated from the disc when the braking pressure is released, resulting in wear of the friction pads 12. That is, the amount of roll-back given according to the machining allowance of the cylinder 21 and friction between the sealing member 30 and the piston 22 may result in high drag.

Further, when the piston 22 returns to an original position thereof, the piston 22 may undergo knock-back, which refers to a phenomenon in which the piston 22 moves forward again by elastic force of the sealing member 30 after moving in the return direction. In addition, when the braking pressure is released, the caliper housing 20 slidably moved from the carrier returns to an original position thereof along with elastic return of the piston 22 by the sealing member 30. However, when the caliper housing 20 is moved leftward in this process, the piston 22 may undergo back slip, that is, slipping in the direction of forward (leftward) movement of the piston 22, which is caused by the sealing member 30 installed at the roll-back chamfer.

Meanwhile, in the case that a compression spring (not shown) is used to move the piston 22 backward, the compression spring is installed at the pad plate 11, which is pressed against the disc D, to provide elastic force in the direction opposite to that of pressing the pad plate 11 against the disc D.

However, when the compression spring is used, the amount of roll-back increases as the friction pad 12 wears, resulting in poor initial brake feel. Further, excessive roll-back of the piston 22 may occur due to the compression spring, resulting in a sinking brake pedal.

SUMMARY

Therefore, it is an aspect of the present invention to provide a disc brake which is provided with a low-pressure spring and a high-pressure spring to operate according to low pressure and high pressure when braking is performed, thereby enhancing return of a piston and securing a space between the disc and the friction pads through restoring force of the piston when braking operation is terminated.

It is another aspect of the present invention to provide a disc brake that has a push rod supporting a low-pressure spring and a ramp supporting a high-pressure spring which are adapted to move together by engaging with each other, thereby allowing the push rod and the ramp to be coaxially maintained when the brake is applied or released.

Additional aspects of the invention will be set forth in part in the description which follows and, in part, will be obvious from the description, or may be learned from practice of the invention.

In accordance with one aspect of the present invention, a disc brake having a carrier at which a pair of pad plates is installed to be movable forward and backward and a caliper housing which is slidably installed on the carrier and provided with a cylinder allowing a piston to be installed therein to be movable forward and backward by hydraulic brake pressure, may include an adjuster installed in the piston to prevent the pad plates from moving away from a disc and to maintain the pad plates a constant distance from the disc, a push rod installed in the cylinder, a front portion thereof being screw-coupled to the adjuster and a rear portion thereof being provided with a flange extending toward an inner circumferential surface of the cylinder, a ramp coupled to the flange to prevent rotation of the push rod and to move along with the push rod and seated in a seating groove provided at a rear wall of the cylinder, a spring case having an end of one side thereof fixed to the cylinder and forming a predetermined accommodation space between an inner circumferential surface of the cylinder and the push rod, and an elastic member arranged in the accommodation space of the spring case to provide elastic force to the push rod and the ramp.

The push rod may be provided with a plurality of coupling grooves arranged equally spaced apart along an outer circumferential surface of the flange and recessed inward, and the ramp may be provided with a ring-shaped body disposed at a front portion of the flange and a plurality of coupling protrusions formed at positions corresponding to the coupling grooves and protruding rearward from the body.

At least one of the coupling protrusions may be provided with a support protrusion protruding from an outer surface thereof in a radial direction, and the seating groove of the cylinder may be provided with a support groove corresponding to the support protrusion at a position corresponding to the support protrusion.

In addition, a leading end surface of the flange may be spaced a constant distance apart from the body to form a gap in a longitudinal direction.

The elastic member may include a low-pressure spring arranged in the spring case, one end thereof being supported on a surface of the other side of the spring case and the other end thereof being supported by the flange to provide elastic force in a direction of movement of the piston, and a high-pressure spring arranged in the spring case to be spaced a constant distance apart from the low-pressure spring, one end thereof being supported on the surface of the other side of the spring case and the other end thereof being supported by the ramp to provide elastic force in the direction of movement of the piston.

The flange may be provided with a recess recessed to support the low-pressure spring.

In addition, the adjuster may be provided with a head portion adapted to contact the piston and a rod extending rearward from the head portion and provided with threads on an outer circumferential surface thereof, wherein a rear wall of the head portion of the adjuster and an inner side surface of the piston may be respectively provided with a wash installed thereon, and a washer spring may be provided between the washers to cause the adjuster to be pressed against the piston by elastic force of the washer spring.

A distance between the threads of the adjuster and threads of the push rod screw-coupled to each other may decrease to allow the adjuster to be closely coupled to the push rod.

A hydraulic duct to receive hydraulic brake pressure to be applied to the piston may be provided at one end of the caliper housing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
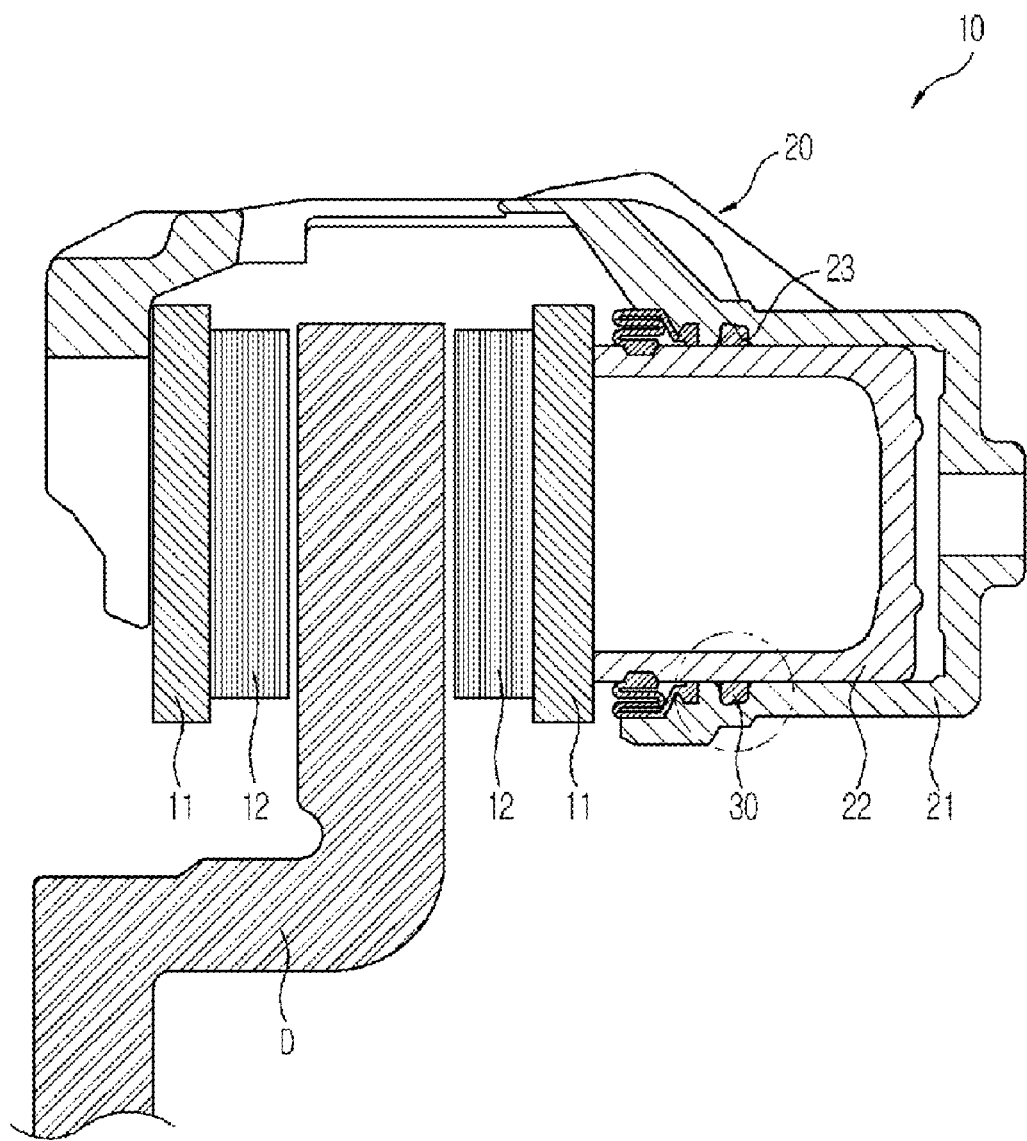
FIG. 1 is a cross-sectional view showing a conventional disc brake.
Figure 2:
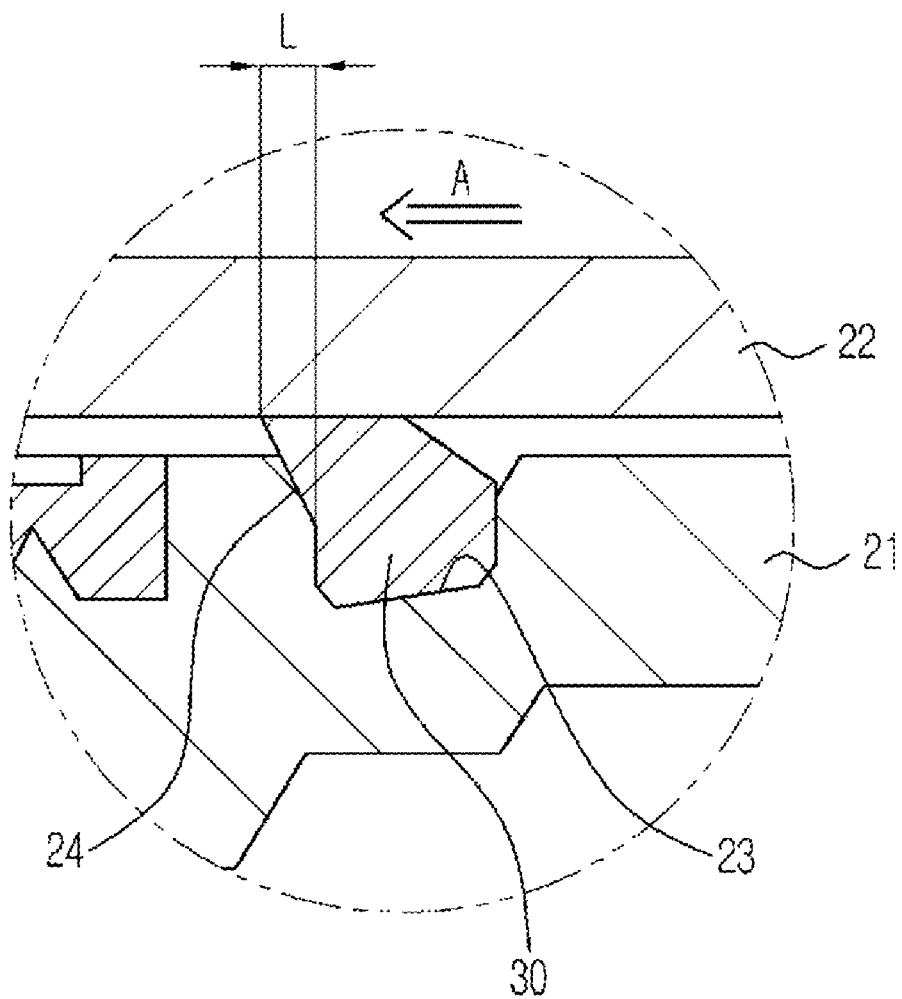
FIG. 2 is a partially enlarged view illustrating operation of the conventional disc brake.

Reference will now be made in detail to the embodiments of the present invention, examples of which are illustrated in the accompanying drawings, wherein like reference numerals refer to like elements throughout.

Figure 3:
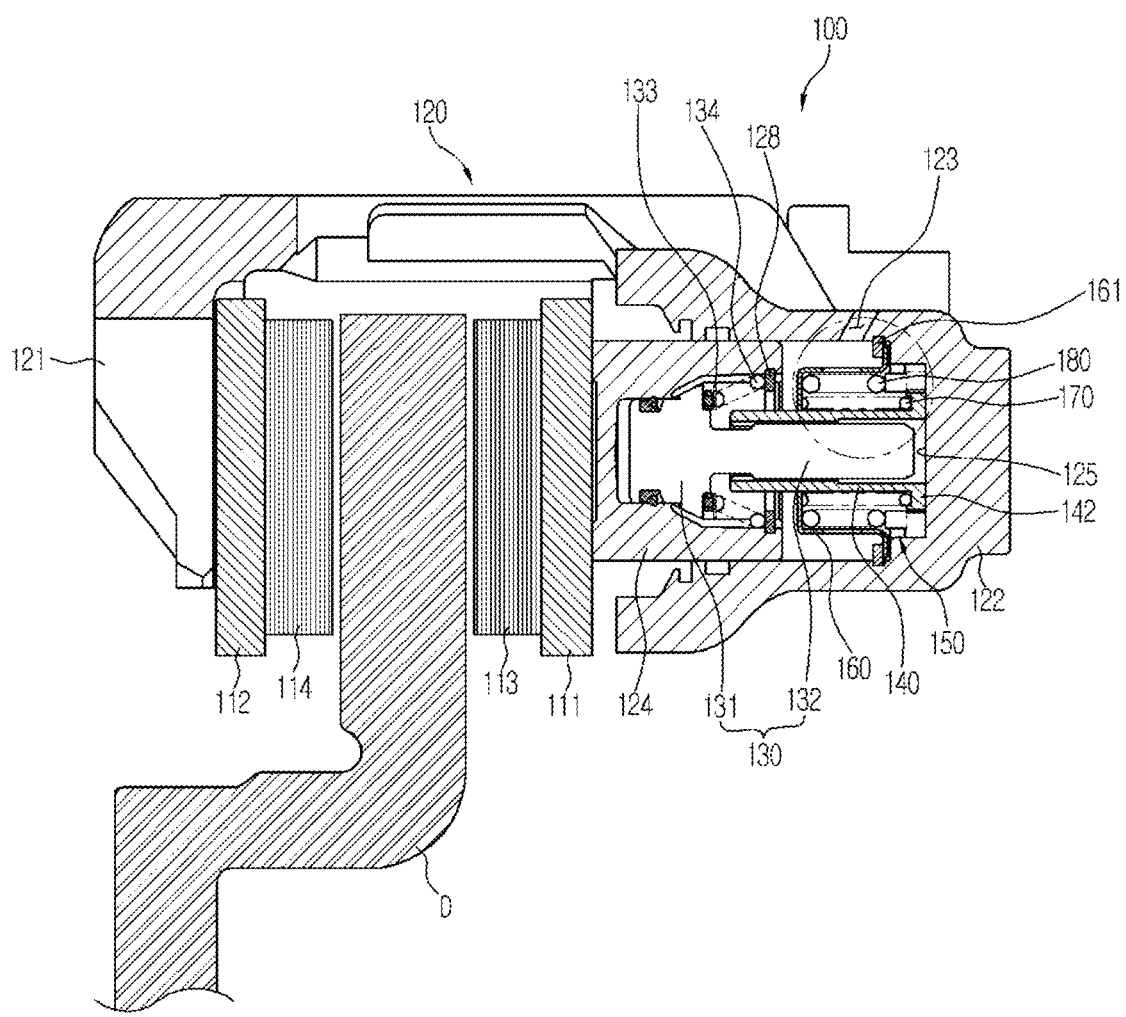
FIG. 3 is a cross-sectional view showing a disc brake according to an exemplary embodiment of the present invention.
Figure 4:
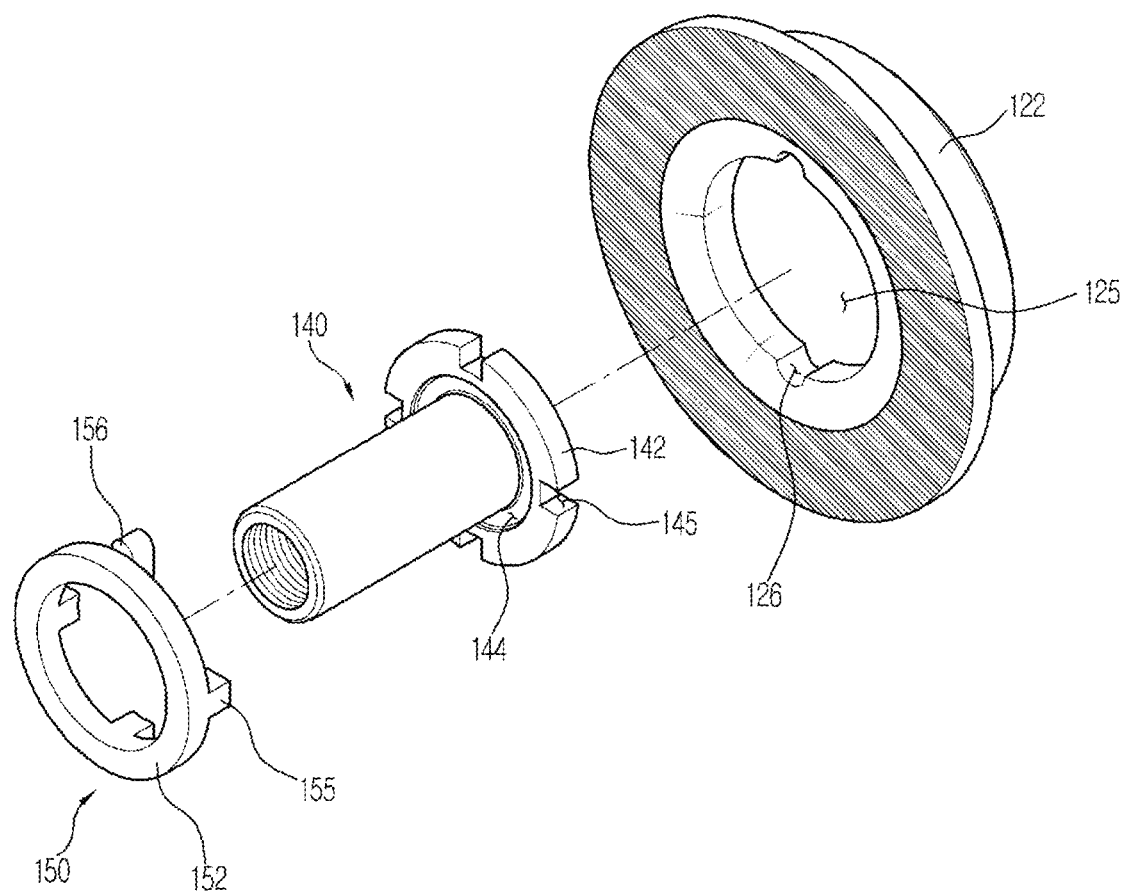
FIG. 4 is a perspective view illustrating installation of a push rod and a ramp provided to the disc brake according to the illustrated embodiment of the present invention.

FIG. 3 is a cross-sectional view showing a disc brake according to an exemplary embodiment of the present invention, and FIG. 4 is a perspective view illustrating installation of a push rod and a ramp provided to the disc brake according to the illustrated embodiment of the present invention.

Referring to FIGS. 3 and 4, a disc brake 100 includes a caliper housing 120 at which a piston 124 is installed to be moved forward and backward by hydraulic brake pressure, a carrier (not shown) fixed to a vehicle body and coupled with the caliper housing 120 to allow the caliper housing 120 to be slidable, a pair of pad plates 111 and 112 installed at the carrier to be spaced a certain distance apart from each other and slidable toward a disc D rotating together with a wheel to be pressed against the disc D, an adjuster 130 to prevent the pad plates 111 and 112 from moving away from the disc D and maintain the pad plates 111 and 112 at a certain distance from each other, a push rod 140 screw-coupled with the adjuster 130, a ramp 150 coupled with the push rod 140 to support the push rod 140 and installed at a cylinder 122 of the caliper housing 120, a spring case 160 forming a predetermined accommodation space between the inner lateral surface of the cylinder 122 and the push rod 140, and an elastic member including a low-pressure spring 170 and a high-pressure spring 180.

The carrier (not shown) is fixed to a knuckle in the vehicle body through mounting bolts (not shown), and the caliper housing 120 is slidably coupled to opposite ends of the carrier through a guide rod (not shown). In addition, the pad plates 111 and 112 are mounted at the center of the carrier to be spaced a certain distance apart from each other and slidable in the directions in which they face each other.

The pad plates 111 and 112 are divided into an inner pad plate 111 disposed to adjoin the piston 124, which will be described below, and provided with a friction pad 113 attached to an inner side surface thereof, and an outer pad plate 112 disposed to adjoin a finger 121, which will be described below, and provided with a friction pad 114 attached to an inner side surface thereof. The disc D is formed in a shape of a circular plate rotating together with a wheel (not shown), and rotates with a portion thereof interposed between the pad plates 111 and 112.

The caliper housing 120 includes the finger 121 to operate the outer pad plate 112 and a cylinder 122 provided with a hydraulic duct 123 allowing hydraulic brake pressure to be transferred therethrough.

The finger 121 is formed to bend downward from the front portion of the caliper housing 120 to surround the outer pad plate 112 at the outside of the outer pad plate 112. Accordingly, when braking is applied, the caliper housing 120 is slidably moved rightward from the carrier to cause the outer pad plate 112 to be pushed toward the disc D and pressed against the disc D by the finger 121.

The cylinder 122 is arranged at the rear side of the caliper housing 120 to allow hydraulic brake pressure generated in a master cylinder (not shown) to be transferred, and the piston 124 is installed in the cylinder 122 to be movable forward and backward. That is, the piston 124 installed in the cylinder 122 is moved forward and backward within the cylinder 122 by the hydraulic brake pressure. Formed at the rear wall of the cylinder 122 is a seating groove 125 allowing the push rod 140 and the ramp 150, which will be described later, to be seated therein. The seating groove 125 will be described below.

The piston 124 is formed in a shape of a cup having one opened side. A head portion 131 of the adjuster 130, which will be described later, is inserted into the inner central portion of the piston 124 to contact the piston 124.

The adjuster 130 includes a head portion 131 installed in the piston 124 inserted into the cylinder 122 to contact the piston 124, and a rod 132 extending from the head portion 131 and provided with threads on the outer circumferential surface thereof. As described above, the head portion 131 is inserted into the piston 124 through the open portion of the piston 124 to contact the piston 124.

Such an adjuster 130, which serves to prevent the gap between the disc D and the pad plates 111 and 112 from expanding as the friction pads 113 and 114 attached to the pad plates 111 and 112 wear and to maintain a constant distance therebetween, has washers 128 and 133 installed respectively at the inner lateral surface of the piston 124 and the rear wall of the head portion 131 and a washer spring 134 arranged between the washers 128 and 133. That is, the adjuster 130 is arranged to contact the piston 124 by the washer spring 134 installed between the inner lateral surface of the piston 124 and the head portion 131. Therefore, as the washer spring 134 presses the adjuster 130 toward the leading end of the piston 124, the adjuster 130 is kept in contact with the piston 124 even when the friction pads 113 and 114 of the pad plates 111 and 112 are worn out due to friction with the disc D to cause the position of the piston 124 to be shifted toward the inner pad plate 111.

The push rod 140 installed in the cylinder 122 is screw-coupled to the rear side of the adjuster 130, i.e., the rod 132. Thereby, when the piston 124 is moved forward by hydraulic brake pressure, the adjuster 130 coupled with the piston 124 is moved forward together with the piston 124, and the push rod 140 screw-coupled with the adjuster 130 is also moved forward. Thereby, the distance between the threads of the adjuster 130 and the push rod 140 screw-coupled with each other decreases. That is, a gap that is generally present between the threads of the adjuster 130 and the push rod 140 is reduced as the adjuster 130 is arranged to be pressed in the direction of forward movement of the piston 124 (leftward), and thereby the adjuster 130 and the push rod 140 simultaneously move.

The push rod 140 is formed to have a hollow core and threads arranged on the inner circumferential surface thereof to be screw-coupled to the adjuster 130. In addition, provided at the rear portion of the push rod 140 is a flange 142 extending toward the inner circumferential surface of the cylinder 122. The push rod 140 is seated in the seating groove 125 along with the ramp 150, which will be described below, and is prevented from rotating by the ramp 150.

As the push rod 140 is screw-coupled with the adjuster 130 and rotation thereof is prevented, the adjuster 130 is movable in the longitudinal direction of the push rod 140. That is, when the piston 124 moves due to wear of the friction pads 113 and 114, the adjuster 130, which is caused to closely contact the piston 124 by the washer spring 134, rotates to move from the push rod 140 by the traveling distance of the piston 124 to remain in close contact with the piston 124. Thereby, the distance between the disc D and the pad plates 111 and 112 to which pressure is applied by the piston 124 is kept constant.

Meanwhile, the flange 142 of the push rod 140 is provided with a plurality of coupling grooves 145 arranged equally spaced along the outer circumferential surface of the flange 142 and recessed inward. As the coupling protrusions 155 formed at the ramp 150 are fitted into the coupling grooves 145, the push rod 140 is coupled to the ramp 150.

The ramp 150 is provided with a body 152 disposed at the front portion of the flange 142 and a plurality of coupling protrusions 155 protruding from the body 152 to the rear side. The coupling protrusions 155 are formed at the positions corresponding to those of the coupling grooves 145 formed at the flange 142.

The body 152 is formed in the shape of a ring to support the high-pressure spring 180, which will be described later. The diameter of the outer circumferential surface of the body 152 corresponds to that of the flange 142, while the diameter of the inner circumferential surface of the body 152 is formed to be greater than that of the portion of the push rod 140 coupled to the adjuster 130. That is, the push rod 140 is spaced apart from the inner circumferential surface of the body 152. This is intended to allow the low-pressure spring 170, which will be described later, to be supported by the flange 142.

Meanwhile, at least one of the coupling protrusions 155 of the ramp 150 is provided with a support protrusion 156 protruding from the outer lateral surface thereof in a radial direction. A support groove 126 is formed in a shape corresponding to that of the support protrusion 156 at a position of the seating groove 125 of the cylinder 122 corresponding to that of the support protrusion 156. Accordingly, the ramp 150, rotation of which is limited by the support protrusion 156, may be guided in an axial direction to move forward and backward. Thereby, the push rod 140 coupled to the ramp 150 is prevented from rotating by the ramp 150. The push rod 140 engages with the ramp 150, thereby moving together with the same.

Figure 5:
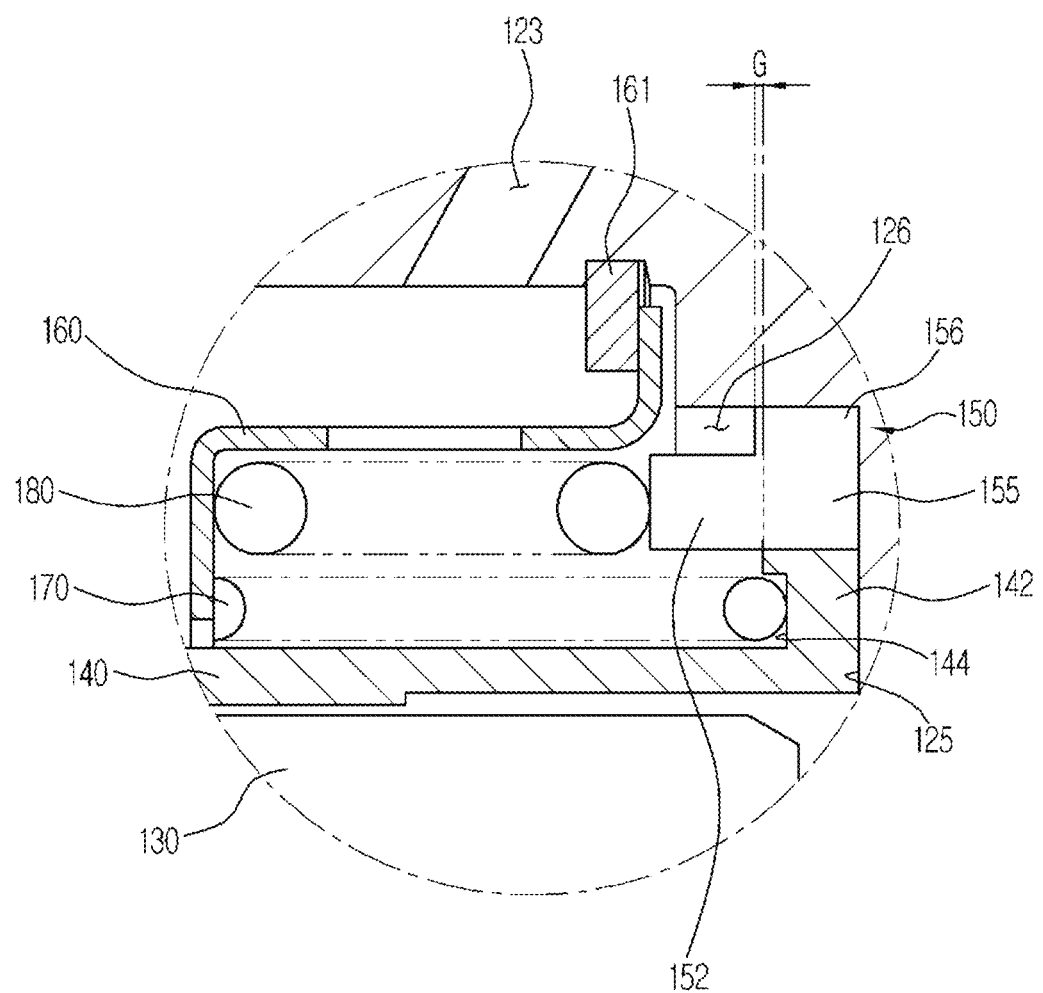
FIG. 5 is a partially enlarged view illustrating a gap formed between the push rod and the ramp arranged at the disc brake according to the illustrated embodiment of the present invention.

When the push rod 140 is coupled to the ramp 150 and seated in the seating groove 125, the leading end surface of the flange 142 is spaced a certain distance apart from the body 152 to form a gap in a longitudinal direction. That is, the length of the coupling protrusions 155 is greater than the thickness of the flange 142 to form a gap G of a certain size as shown in FIG. 5. This is intended to secure a distance between the disc D and the pad plates 111 and 112.

The spring case 160 is arranged to form a predetermined accommodation space between the push rod 140 and the inner lateral surface of the cylinder 122. Specifically, one end of the spring case 160 is fixed to the ramp 150 by a snap ring 161. An elastic member to return the push rod 140 and the ramp 150 to original positions thereof to return the piston 124 is provided in the spring case 160. The elastic member includes a low-pressure spring 170 and a high-pressure spring 180. One end of the low-pressure spring 170 is supported by one side surface of the spring case 160 and the other end thereof is supported by the flange 142. The high-pressure spring 180 is spaced a certain distance from the low-pressure spring 170. One end of the high-pressure spring 180 is supported by the one side surface of the spring case 160 and the other end thereof is supported by the leading end surface of the ramp 150 coupled to the push rod 140, i.e., by the body 152. Here, the leading end surfaces of the flange 142 and the ramp 150 which support the low-pressure spring 170 and high-pressure spring 180 are arranged in a stepped manner, forming a step portion. The low-pressure spring 170 and the high-pressure spring 180 are spaced apart from each other in a longitudinal direction by the step portion.

As the structure to support the low-pressure spring 170 and the high-pressure spring 180 is provided as above, the low-pressure spring 170 is supported by the flange 142 and the high-pressure spring 180 is supported by the body 152 when the disc brake 100 does not operate. When the brake is applied and the adjuster 130 and the push rod 140 are moved according to movement of the piston 124, the low-pressure spring 170 supported by the flange 142 of the push rod 140 is first compressed as shown in FIG. 5. As the low-pressure spring 170 is compressed by a distance beyond the size of the gap G between the flange 142 and the body 152 of the ramp 150, the flange 142 contacts the body 152 of the ramp 150 and the push rod 140 and the ramp 150 move together. That is, the ramp 150 supports the high-pressure spring 180, and thereby both the low-pressure spring 170 and the high-pressure spring 180 are compressed.

Meanwhile, the flange 142 is provided with a recess 144 formed to be recessed to stably support the low-pressure spring 170.

Hereinafter, operation of the disc brake 100 as above will be described.

The disc brake 100 according to the illustrated embodiment is first installed at a vehicle. That is, the gap G is formed between the flange 142 of the push rod 140 and the body 152 of the ramp 150, and thereby a gap between the disc D and the pad plates 111 and 112 is secured.

When the brake is applied in this state, hydraulic brake pressure is introduced into the cylinder 122, causing the piston 124 to apply pressure to the inner pad plate 111. Thereby, the friction pad 113 attached to the inner pad plate 111 is pressed against the disc D. At the same time, the caliper housing 120 slides from the carrier (not shown) according to reaction force, and thereby the finger 121 applies pressure to the outer pad plate 112, causing the friction pad 114 attached to the outer pad plate 112 to be pressed against the disc D to generate braking force.

Figure 6:
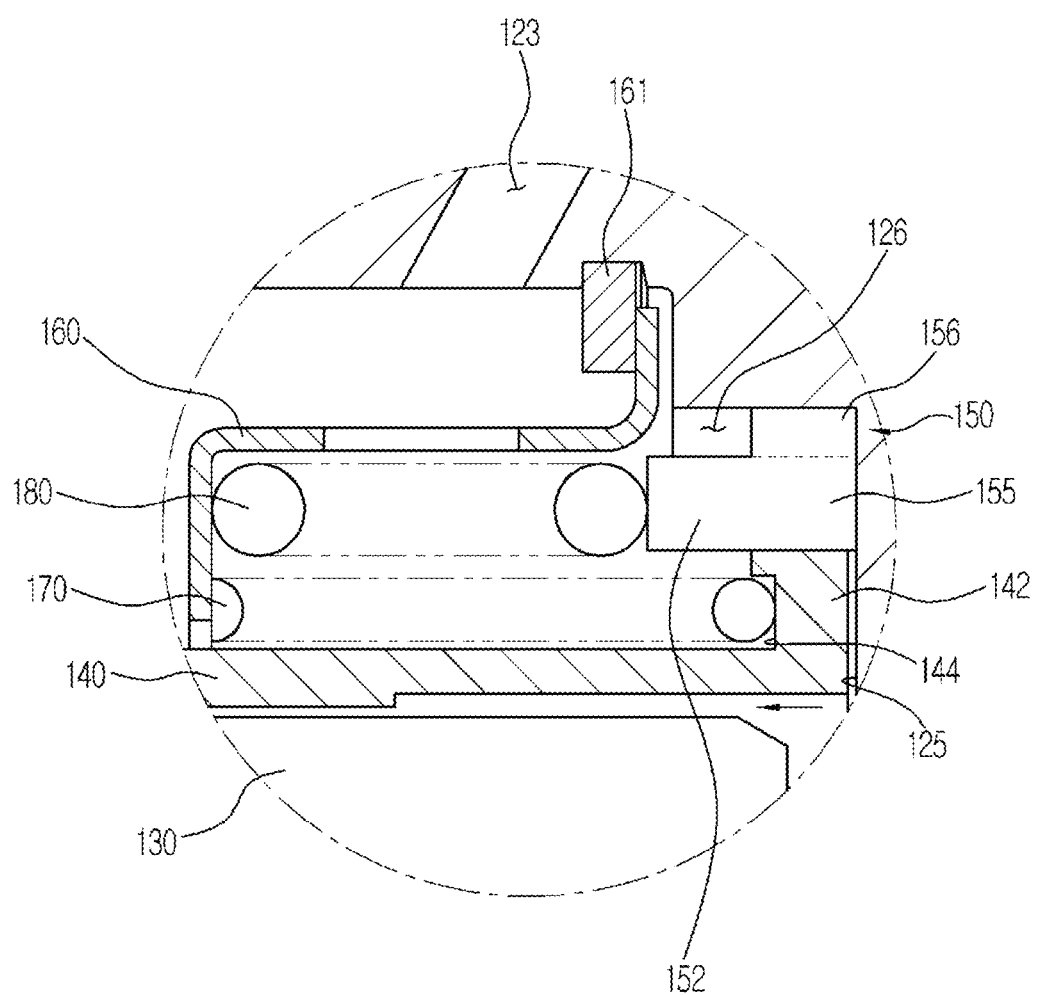
FIGS. 6 and 7 are views illustrating operation of the disc brake according to the illustrated embodiment of the present invention.
Figure 7:
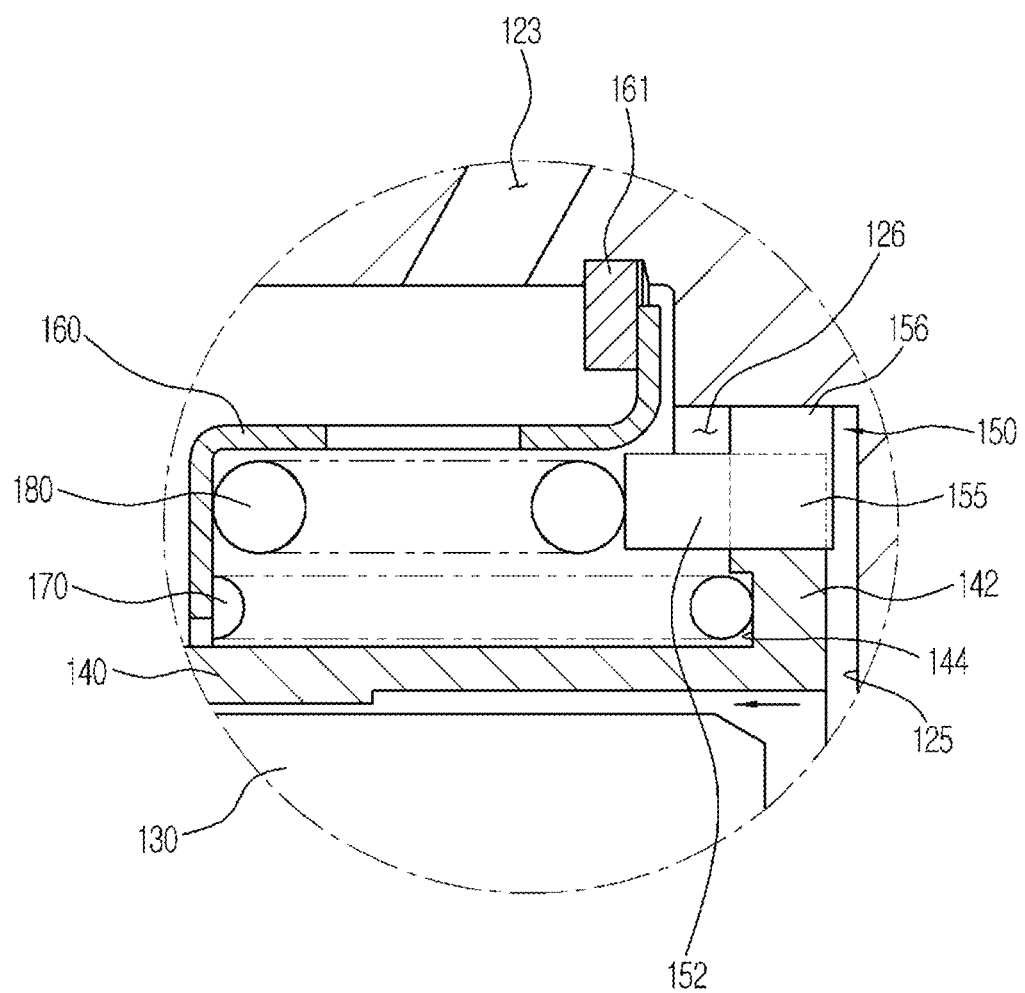

Meanwhile, as the piston 124 moves, the adjuster 130 adjoining the piston 124 and the push rod 140 coupled to the adjuster 130 move together. At this time, the push rod 140 moves to compress only the low-pressure spring 170 supported by the flange 142. That is, as shown in FIG. 6, the push rod 140 moves a distance corresponding to the gap G between the push rod 140 and the ramp 150 to compress the low-pressure spring 170. Further, once the push rod 140 moves by the gap G, the flange 142 contacts the body 152 of the ramp 150, and then the push rod 140 and the ramp 150 move together (see FIG. 7). That is, both the low-pressure spring 170 and the high-pressure spring 180 are compressed. When the push rod 140 and the ramp 150 move, rotation thereof is limited by the support protrusion 156 and movement thereof is guided with respect to the cylinder 122.

Additionally, as the low-pressure spring 170 and the high-pressure spring 180 are arranged to be respectively supported by the push rod 140 and the ramp 150 and the gap G is formed between the push rod 140 and the ramp 150, the low-pressure spring 170 and the high-pressure spring 180 may be operable at different pressures, for example, a low pressure and a high pressure. That is, at low pressure, the push rod 140 moves only a distance corresponding to the gap G. At high pressure, the push rod 140 engages and moves with the ramp 150.

After braking is completed, the push rod 140 and the ramp 150 are returned to original positions thereof by the high-pressure spring 180 and the low-pressure spring 170, and thereby the piston 124 smoothly moves backwards, without suffering drag. Once the ramp 150 is caused to contact the seating groove 125 of the cylinder 122 by the high-pressure spring 180, the low-pressure spring 170 finally moves the push rod 140 by a distance corresponding to the gap G to return the push rod 140 to the original position thereof. In addition, since the adjuster 130 screw-coupled to the push rod 140 and the piston 124 return to original positions thereof, the effect of return of the piston 124 is enhanced. Thereby, the initial gap between the disc D and the friction pads 113 and 114 is maintained. In addition, as the push rod 140 and the ramp 150 are arranged to move together, the push rod 140 and the ramp 150 may remain on the same axis.

When the friction pads 113 and 114 wear out due to braking, the distance between the disc D and the pad plates 111 and 112, i.e., the distance between the disc D and the friction pads 113 and 114 is automatically adjusted by the adjuster 130.

As is apparent from the above description, a disc brake according to the embodiments of the present invention is provided with a low-pressure spring operating according to low pressure in braking and a high-pressure spring operating according to high pressure, and thus may not only prevent drag by moving the piston backward, but also secure a space between the disc and the pad plates.

In addition, the disc brake according to the embodiments of the present invention may also improve initial brake feel through elimination of increase in the amount of roll-back according to wear of the friction pads which are pressed against a disc.

Thereby, wear of the friction pads due to unnecessary friction between the friction pads and the disc and noise resulting therefrom may be prevented. Moreover, normal braking force may be ensured by allowing the pad plates to be spaced a constant distance from the disc.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disc brake having a pair of pad plates installed to be movable forward and backward and a caliper housing which is slidably installed and provided with a cylinder allowing a piston to be installed therein to be movable forward and backward by hydraulic brake pressure, the disc brake comprising:
   an adjuster installed in the piston to prevent the pad plates from moving away from a disc and to maintain the pad plates a constant distance from the disc;
   a push rod installed in the cylinder, a front portion thereof being screw-coupled to the adjuster and a rear portion thereof being provided with a flange extending toward an inner circumferential surface of the cylinder;

an element coupled to the flange to prevent rotation of the push rod and to move along with the push rod and seated in a seating groove provided at a rear wall of the cylinder;

a spring case having an end of one side thereof fixed to the cylinder and forming a predetermined accommodation space between an inner circumferential surface of the cylinder and the push rod; and an elastic member arranged in the accommodation space of the spring case to provide elastic force to the push rod and the element, wherein the elastic member comprises:

a low-pressure spring is arranged in the spring case, one end thereof being supported on a surface of the other side of the spring case and the other end thereof being supported by the flange to provide elastic force in a direction of movement of the piston; and a high-pressure spring is arranged in the spring case to be spaced a constant distance apart from the low-pressure spring, one end thereof being supported on the surface of the other side of the spring case and the other end thereof being supported by the element to provide elastic force in the direction of movement of the piston.

2. The disc brake according to claim 1, wherein:

the push rod is provided with a plurality of coupling grooves arranged equally spaced apart along an outer circumferential surface of the flange and recessed inward; and the element is provided with a ring-shaped body disposed at a front portion of the flange and a plurality of coupling protrusions formed at positions corresponding to the coupling grooves and protruding rearward from the body.

3. The disc brake according to claim 2, wherein:

at least one of the coupling protrusions is provided with a support protrusion protruding from an outer surface thereof in a radial direction; and the seating groove of the cylinder is provided with a support groove corresponding to the support protrusion at a position corresponding to the support protrusion.

4. The disc brake according to claim 2, wherein a leading end surface of the flange is spaced a constant distance apart from the body to form a gap in a longitudinal direction.

5. The disc brake according to claim 1, wherein the flange is provided with a recess recessed to support the low-pressure spring.

6. The disc brake according to claim 1, wherein the adjuster is provided with a head portion adapted to contact the piston and a rod extending rearward from the head portion and provided with threads on an outer circumferential surface thereof, wherein a rear wall of the head portion of the adjuster and an inner side surface of the piston are respectively provided with washers installed thereon, and a washer spring is provided between the washers to cause the adjuster to be pressed against the piston by elastic force of the washer spring.

7. The disc brake according to claim 1, wherein a distance between the threads of the adjuster and threads of the push rod screw-coupled to each other decreases to allow the adjuster to be coupled to the push rod.

8. The disc brake according to claim 1, wherein a hydraulic duct to receive hydraulic brake pressure to be applied to the piston is provided at one end of the caliper housing.

* * * * *